Figure 1:
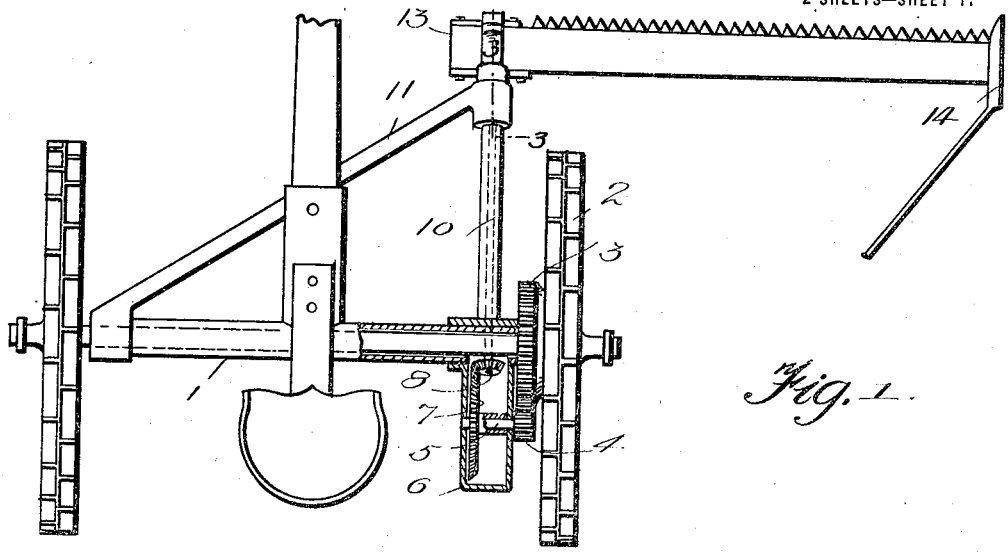

E. B. FUQUA.
MOWING BLADE.
APPLICATION FILED MAR. 20, 1917.

1,245,897.

Patented Nov. 6, 1917.
2 SHEETS—SHEET 1.

WITNESSES

INVENTOR
Edward B. Fuqua
BY
ATTORNEYS

E. B. FUQUA.
MOWING BLADE.
APPLICATION FILED MAR. 20, 1917.

1,245,897.

Patented Nov. 6, 1917.
2 SHEETS—SHEET 2.

WITNESSES
INVENTOR
Edward B. Fuqua
BY
ATTORNEYS

UNITED STATES PATENT OFFICE.

EDWARD BROWN FUQUA, OF MEMPHIS, TENNESSEE.

MOWING-BLADE.

1,245,897.  Specification of Letters Patent.  Patented Nov. 6, 1917.

Application filed March 20, 1917. Serial No. 156,065.

*To all whom it may concern:*

Be it known that I, EDWARD BROWN FUQUA, a citizen of the United States, and a resident of Memphis, in the county of Shelby and State of Tennessee, have invented a new and useful Improvement in Mowing-Blades, of which the following a specification.

My invention is an improvement in mowing blades and has for its object to provide a device of the character specified, wherein the cutter is an endless belt carrying cutting blades which coöperate with fixed blades or guards, the cutter carrying belt being mounted in a hollow sickle bar with blades extending from one edge thereof, thus eliminating the shock and jar of a reciprocating blade and consequent loss of power.

In the drawings:—

Figure 2:
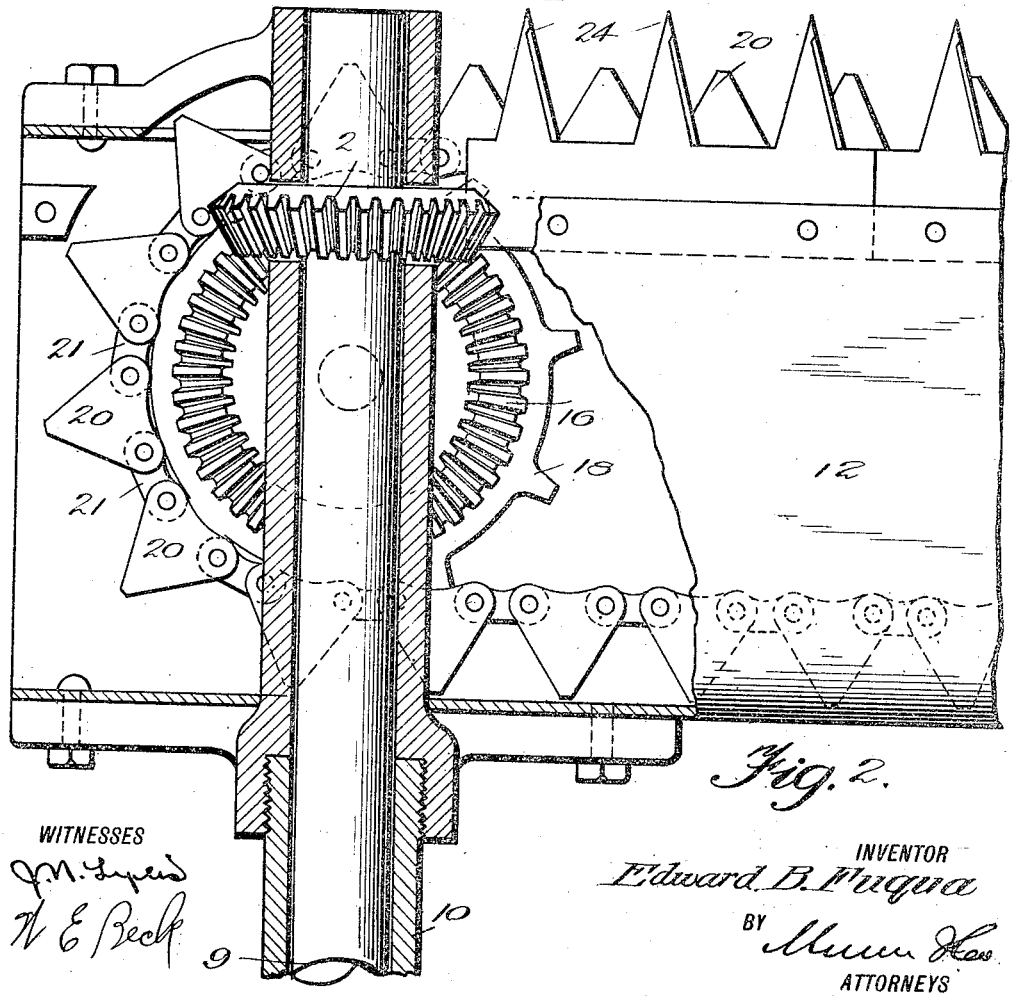
Figure 3:
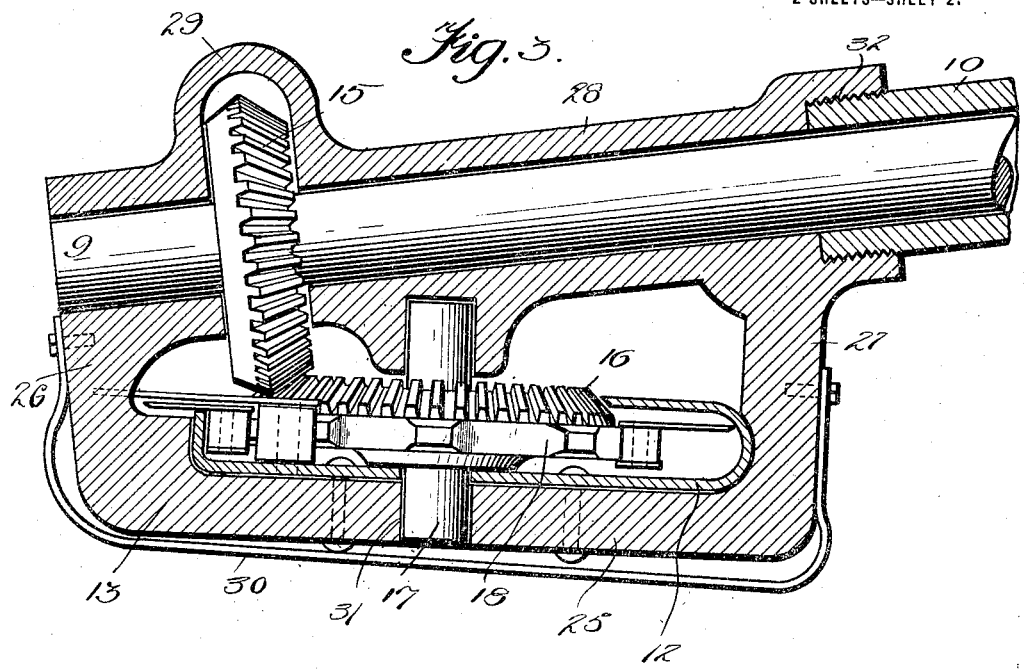
Figure 4:
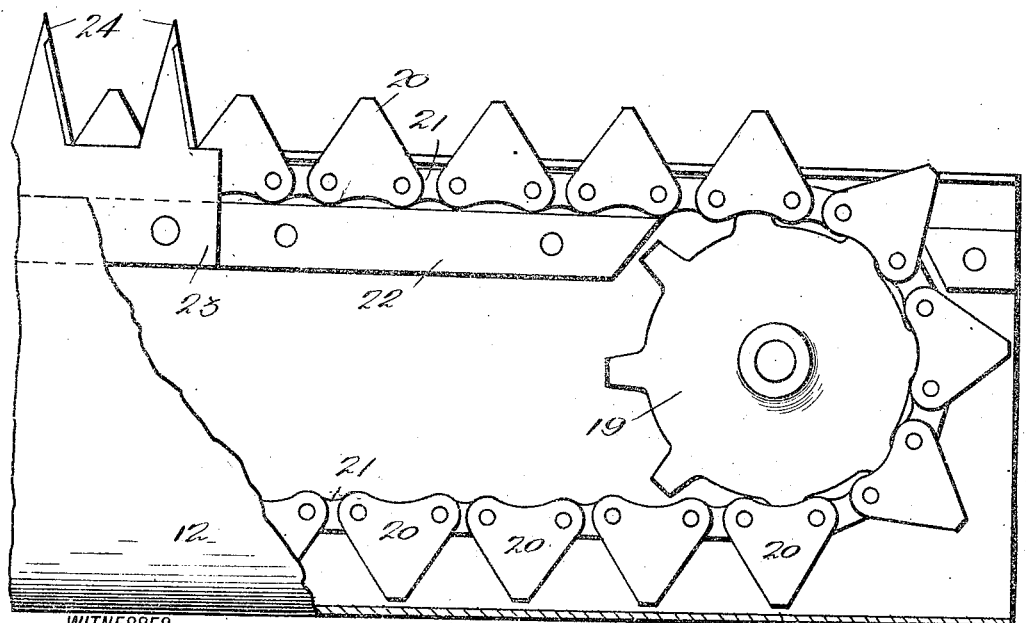

Figure 1 is a top plan view of a machine provided with the improved blades, with parts in section, Fig. 2 is an enlarged detail of the driving connection between the transmission shaft and the blade, Fig. 3 is a sectional view taken substantially on the line 3—3 of Fig. 1, showing parts on a larger scale, Fig. 4 is a top plan view of the outer end of the cutter bar with parts in section.

In the present embodiment of the invention the improved cutter bar is shown in connection with a mowing machine 1 of usual construction having wheels 2, to one of which is secured a gear wheel 3, and the said wheel meshes with a pinion 4 on a stub shaft 5 journaled in a housing 6 connected with the axle housing. This stub shaft has a bevel gear 7 which meshes with a bevel gear 8 on a transmission shaft 9, and the transmission shaft is journaled in the housing 10 arranged at right angles to the housing of the axle, and connected to the said housing at the outer end of the housing 10 and the opposite end of the axle housing by an inclined brace bar 11.

The cutter bar comprises a casing 12 of sheet metal having at each end heavy housings or castings 13 and 14 respectively. The shaft 9 extends into the housing 13, where it is provided with a bevel gear 15, which meshes with a series of bevel gear teeth 16 on a stub shaft 17 journaled in the housing, and having a sprocket wheel 18. A similar sprocket wheel 19 is journaled at the outer end of the cutter bar 12, and an endless belt is supported on the two sprockets 18 and 19.

This belt consists of a series of blades 20 of substantially triangular form, and connected by links 21 to form the belt, and at that run of the belt where the blades 20 extend from the housing 12, a guard or guide in the form of a bar 22 is provided, the said guide extending from one sprocket wheel 18 to the other wheel 19, and the inner face of the belt moves on the guard.

Plates 23 are secured to the said bar 22 above the chain, and each of these plates is provided with a series of guard teeth 24, which serve in effect as ledger blades for the cutting blades. The casting 14 at the outer end of the cutter bar is a shoe which runs upon the ground to support the outer end of the cutter bar. The front of the casing 12 is open to permit the blades to extend beyond the same, and the grain stalks will be caught between the blades and the guard teeth and will be cut as the belt moves.

The arrangement is such that the forward run of the belt moves inwardly. With the improved cutter there is no jerk and jar due to reciprocation of a cutter, and the wear and tear on the machine is greatly reduced. The tendency to choke the blades and the consequent pulling of the grass or grain is also eliminated.

The housing 13 consists of a lower portion 25, front and rear uprights 26 and 27, respectively, and an upper portion 28 having an arch-shaped part 29 near its forward end in which is received the upper portion of the bevel gear 15 to hold such gear in fixed relation to the gear wheel 16. These several parts constitute a single casting and the part 28 is hollow to form a bearing in which the shaft 9 is journaled. The inner end of the casing 12 is secured upon the part 25 of the housing. A heavy plate 30 extends beneath the housing 13 and its front and rear portions project upwardly and are secured to the respective uprights 26 and 27. The plate 30 forms a shoe for the inner end of the casing 12 and covers the lower end of the opening 31 in which the shaft 17 is journaled. The shaft 17 is journaled in openings formed in the parts 28 and 25 of the housing and is placed in position from below. The bearing portion 28 of the housing is longitudinally inclined relatively to the base portion 25 to correspond with the inclination of the shaft 9 and the uprights 26 and 27 are of varying lengths to agree with the distance between corresponding ends of the parts 28 and 25. The housing 10 is threaded into the bearing part 28 at 32.

I claim:—

Cutting mechanism for a mowing machine comprising a hollow casing inclosing an endless cutter, a casting comprising a lower portion having the casing secured to the top thereof, an upper longitudinally inclined portion extending over the casing and including an arch-shaped part, and front and rear uprights connecting corresponding ends of the upper and lower portions of the casting, a shoe extending beneath the casting and having its front and rear portions extended alongside the upright portions of the casting and secured thereto, a housing attached to the upper portion of the casting, a shaft journaled in said housing and upper part of the casting, a gear wheel mounted on said shaft and having a portion extending into the arch-shaped part of the casting, a stub shaft journaled in the upper and lower portions of the casting, a gear wheel on the stub shaft and meshing with the before mentioned gear wheel and a sprocket wheel rotatable with the stub shaft and having an end portion of the endless cutter passing therearound

EDWARD BROWN FUQUA.

Witnesses:
BEN G. WASSON,
F. M. DUNCAN.

Copies of this patent may be obtained for five cents each, by addressing the "Commissioner of Patents, Washington, D. C."